United States Patent [19]

Janin

[11] 4,050,842
[45] Sept. 27, 1977

[54] ROTARY CUTTING TOOL
[76] Inventor: André Janin, 33, Boulevard Gambetta, Belleville-sur-Saone, France, 69220
[21] Appl. No.: 690,346
[22] Filed: May 26, 1976
[30] Foreign Application Priority Data
    June 4, 1975    France .................. 75.18156
[51] Int. Cl.² .............. B23B 31/08; B23G 51/00
[52] U.S. Cl. .................... 408/226; 408/219; 408/222; 279/89
[58] Field of Search .............. 408/215–222, 408/226, 238, 231, 239, 186, 714; 279/1 B, 1 J, 1 ME, 16, 89

[56] References Cited

U.S. PATENT DOCUMENTS

| 1,695,564 | 12/1928 | Thomas | 279/89 |
| 2,257,121 | 9/1941 | Nell | 408/147 X |
| 2,449,103 | 9/1948 | Boggis | 408/226 X |
| 2,821,874 | 2/1958 | Oliver | 408/200 X |
| 2,906,146 | 9/1959 | Flannery et al. | 408/186 X |

FOREIGN PATENT DOCUMENTS 403,387   4/1943   Italy .................................. 279/16

*Primary Examiner*—Leonidas Vlachos
*Attorney, Agent, or Firm*—Dowell & Dowell

[57] ABSTRACT

A rotary cutting tool having a cutting element at one end and a cylindrical shank at the other end terminating in a T-shaped mounting tongue member, and a tool support for holding the tool in floating engagement the support having a cylindrical body with a transverse T-slot in its end for receiving said tongue member, the slot having sliding clearances with respect to the tongue member, and the holder having a sleeve which is spring urged to cover the T-slot to retain the tongue member in it, the inner diameter of the bore through the sleeve having a small clearance where it overlies the shank of the tool so that the latter can move transversely to align the tool in a hole when it is in use.

5 Claims, 3 Drawing Figures

ROTARY CUTTING TOOL

The present invention relates to improvements in cutting tools operating with a rotary movement and more particularly, but not exclusively, to taps.

Tools of this kind which have a considerable diameter and whose length is in accordance with the usual standards, represent a considerable quantity of high-speed steel so that the cost price is quite high. Furthermore it takes a relatively long time to change them on automatic machines or transfer machines.

The improvements which form the subject of the present invention aim at obviating these disadvantages and at allowing the provision of cutting tools such as taps which are inexpensive and are easy to mount on machines adapted for using them.

The invention has the further objects;
of providing a device which allows the tool to be re-sharpened without any difficulty since the tool retains its two centre holes,
and of allowing a slight self-centring of the tool relatively to the part being machined.

The cutting tool according to the invention is characterised in that it is made in two parts, namely an active element and a holder which comprises connecting means arranged so that the tool assembly can penetrate into the bore during machining.

The accompanying drawings, given by way of example, will allow the invention to be better understood, likewise the features which the invention offers and the advantages which it can provide:

Figure 1:
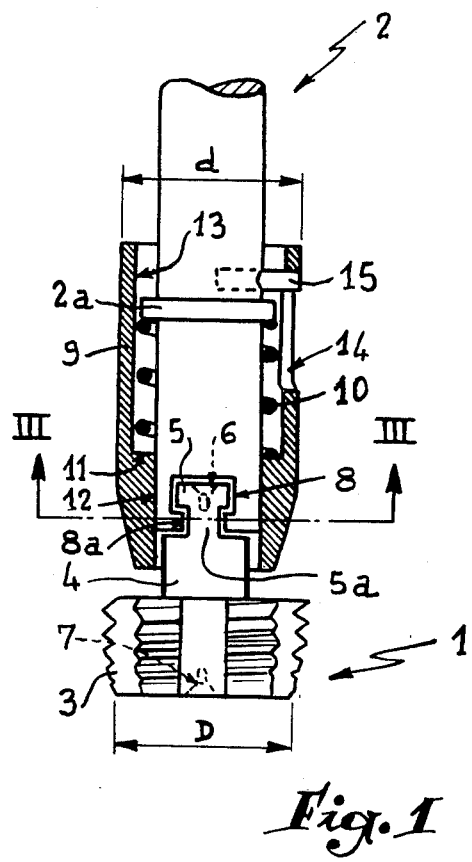
FIG. 1 is an axial section through a device according to the invention.

The cutting tool shown in FIG. 1 comprises an active element 1 and a support of holder 2 suitably assembled together. In the example illustrated, the active element is made in the form of a tap 3 with a large diameter, that is to say, in order to give a clearer idea, a diameter greater than 20 mm. However, it will be apparent that the improvements provided by the present invention may relate to a tap of any other diameter and even to other cutting tools such as boring tools. The tap 3 is surmounted by a cylindrical shank 4 whose free end is in the form of a T-shaped radial tongue 5. It will be noted that a centre hole 6 is provided in the upper face of the tongue 5 and another centre hole 7 in the opposite portion of the tab 3. These centre holes allow the tap to be mounted between machine centres either to machine it or to sharpen it.

The support or holder 2 is in the form of a cylindrical rod terminating at one of its ends in a radial groove 8 which extends right across it and is T-shaped, in which the tongue 5 of the shank 4 of the tap 3 engages with a certain amount of play. A ring 9 is arranged about the end of the holder 2 which co-operates with the shank 4 of the tap, this ring being loaded elastically in the direction of the said end by means of a compression spring 10 which bears on the one hand against a collar 2a of the holder 2 and on the other hand against a shoulder 11 formed within the ring because of the fact that its bore 12 is prolonged by a wider-diameter chamber 13. The ring comprises an oblong aperture 14 directed axially in which a stud 15 engages which is integral with the rod 2 and extends radially towards the outside. Under the action of the spring 10 the stud 15 bears against the upper end (FIG. 1) of the aperture 14 so as to prevent the ring from disengaging from the holder 2. The diameter of the bore 12 of the ring 9 is very slightly larger than that of the shank 4 of the tap. To be more specific, the play is of the order of 0.1 mm for a tap having a diameter of 30 mm. It will be noted that the clearance between the holder 2 and the bore 12 of the ring is as small as possible in order to allow it to slide relatively to the said holder.

The holder 2 can terminate at its end opposite from the groove 8 so as to have a shape identical to that of the shank of ISO standardised taps, and this end may also be given the form of a Morse cone; finally, it is possible to construct the holder 2 so that it has only a relatively short length so as to allow devices according to the present invention to be produced with short dimensions, more particularly to mount them on automatic or semi-automatic lathes.

The method of operation will be appreciated from the foregoing explanations.

Figure 2:
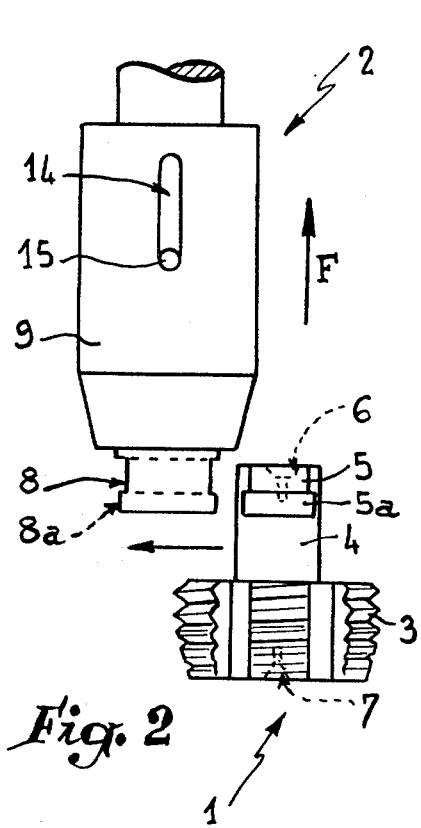
FIG. 2 is an external view thereof showing the two parts of the device immediately before their assembly.

When the active element 1 is to be mounted on the holder 2, first of all the ring 9 is moved in the direction of the arrow F (FIG. 2) so that the two ends of the groove 8 are uncovered. The movement of the ring in the aforesaid direction is of course limited by the fact that the stud 15 abuts against the corresponding end of the aperture 14, but this abutment is not absolutely necessary. The tongue 5 of the shank 4 of the tap is then engaged in the groove 8 until the longitudinal axis of the holder and that of the said shank are situated approximately in alignment with one another. The ring 9 is then released and it returns elastically to come into the position shown in FIG. 1, that is to say it then closes the openings of the groove 8, its travel being limited by the fact that the stud 15 comes to abut on the corresponding end of the aperture 14.

Figure 3:
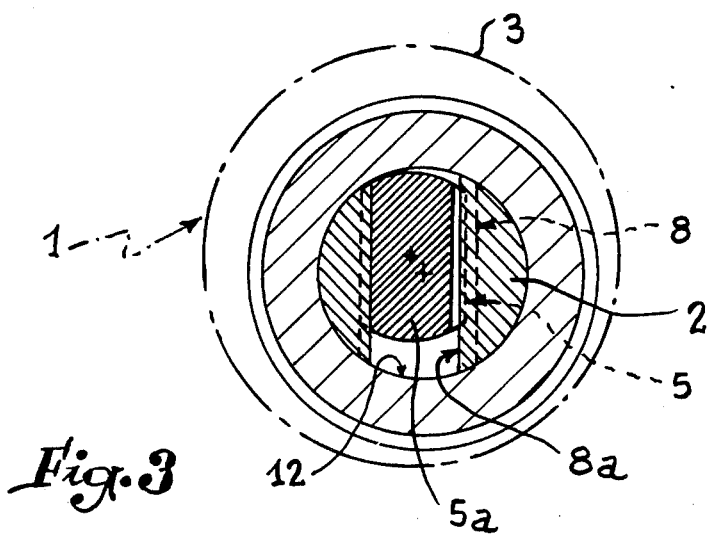
FIG. 3 is a view in section on a larger scale taken on III—III (FIG. 1) illustrating more particularly the way in which the active element can be displaced relatively to its holder or support.

Since the diameter of the shank 4 is less than the bore 12 of the holder 2, the tongue 5 can be displaced radially until one of its ends comes into contact with the face of the said bore (FIG. 3); the tap 3 can therefore be displaced in the transverse direction relatively to the holder 2. On the other hand the tongue 5, the width of which is less than that of the groove 8, can be displaced in this groove perpendicularly to the aforementioned transverse direction. Thus the tap 3 can be displaced slightly in two perpendicular directions relatively to the holder 2, which allows it to centre itself relatively to the part being tapped. It will be noted that the clearance between the head of the tongue 5 and the lateral face of the widened portion of the groove 8 is less than that existing between the undercut portion 5a of the tongue and the corresponding face 8a of the groove 8. Consequently the cutting torque force cannot act upon the undercut portion 5a of the tongue 5.

The length of the tap 3 has been reduced to the minimum so as to reduce its volume considerably, and this represents a considerable saving in high-speed steel, which is an expensive material. This tap may comprise various types of channelling, like standard taps. The active element 1 could be, as explained hereinbefore, a boring tool which has to be mounted in a floating fashion relatively to the driving machine.

It should be understood also that the foregoing description has been given only by way of example and that it does not in any way limit the scope of the invention, and it would not constitute a departure from the scope of this invention to replace the constructional details described by any other equivalent means.

As an alternative, it would be possible to provide a satisfactory concentric assembly of the tool with the holder by giving the shank 4 of the tap a diameter equal to that of the holder 2. Of course, and as will be understood, the diameter D of the active element is to be greater than the external diameter d of the ring so that the latter can if necessary penetrate into the bore being machined.

I claim:

1. A rotary cutting tool and quick-change tool holder operative to support the tool in a floating engagement permitting the tool to shift transversely of the holder through a limited distance, comprising:
   a. a rotary cutting tool having an annular active cutting element and having a cylindrical shank extending therefrom, the shank terminating in a T-shaped tongue portion which is undercut at a location spaced from the end of the shank to leave a head at the end of the shank;
   b. a tool support comprising a cylindrical holder having a transverse T-slot cut therethrough and shaped to recieve the head of the tongue portion as a clearance fit in the inner portion of the T-slot and the undercut portion of the tongue portion as a clearance fit in the outer portion of the T-slot, the cylindrical shank being adjacent to the cylindrical holder when the tongue portion is in the T-slot;
   c. a sleeve member having a bore which is a snug sliding fit on said cylindrical holder and a clearance fit on said shank;
   d. yieldable means normally maintaining the sleeve with its bore surrounding the cylindrical holder and surrounding a portion of the length of the shank between the tongue portion and the cutting element; and
   e. the clearance between the sleeve bore and the portion of the shank which it overlies limiting said transverse shifting of the tool in the holder.

2. In a cutting tool and holder as set forth in claim 1, the clearance between said head and the inner portion of the T-slot being greater than the clearance between said undercut portion of the tongue portion and the outer portion of the T-slot.

3. In a cutting tool and holder as set forth in claim 1, said ring having a step in its bore and said cylindrical holder having an abutment thereon, and means in the ring between the step and the abutment resiliently urging the ring to overlie a portion of said shank.

4. In a cutting tool and holder as set forth in claim 3, the diameter of the active cutting element being greater than the outside diameter of said ring.

5. In a cutting tool and holder as set forth in claim 1, the inner and outer portions of the T-slot being narrow as compared with their lengths as measured transversely of the cylindrical holder, and the head and undercut portions of the T-shaped tongue portion of the shank being flattened to fit within the slot with clearances about equal to the clearance between the bore of the sleeve and the cylindrical shank.

* * * * *